United States Patent [19]

Hill

[11] Patent Number: 4,817,852

[45] Date of Patent: Apr. 4, 1989

[54] METHOD OF REPLACING DRILL BIT HEADS

[75] Inventor: C. L. Hill, Ft. Loudon, Pa.

[73] Assignee: T. H. Industries, Fort Lauden, Pa.

[21] Appl. No.: 105,587

[22] Filed: Oct. 8, 1987

[51] Int. Cl.$^4$ ............................................. B23K 20/12
[52] U.S. Cl. .................................... 228/114; 228/119; 228/113; 76/108 A
[58] Field of Search ................................ 228/112–114, 228/119, 2; 76/108 A

[56] References Cited

U.S. PATENT DOCUMENTS

| 3,618,196 | 11/1971 | Sluetz | 228/113 |
| 4,074,449 | 2/1978 | Lanz et al. | 228/114 |
| 4,323,185 | 4/1982 | Grilli et al. | 228/114 |
| 4,333,671 | 6/1982 | Holko | 228/112 |

FOREIGN PATENT DOCUMENTS

| 2457392 | 6/1965 | Fed. Rep. of Germany | 228/112 |
| 3462 | 2/1969 | Japan | 228/112 |
| 1174335 | 8/1986 | Japan | 228/114 |
| 1475678 | 6/1977 | United Kingdom | 228/112 |

OTHER PUBLICATIONS

"The International Symposium on Friction Welding", Jul. 23, 1969, ISFN Document No. 9, pp. 9–13, Metals Handbook, vol. 6, pp. 719–728.

*Primary Examiner*—Nicholas P. Godici
*Assistant Examiner*—Samuel M. Heinrich
*Attorney, Agent, or Firm*—Dowell & Dowell

[57] ABSTRACT

A method of joining impact or cutting heads to the shanks of down-the-hole rock drilling bits utilizing inertia welding techniques wherein the interfacing portions of the heads and shanks are structured to provide appropriate flash relief areas adjacent generally planar and abutting contact surfaces of the heads and shanks so as to promote the thorough and continuous diffusion bonding of the components across the total area of such contact surfaces.

14 Claims, 3 Drawing Sheets

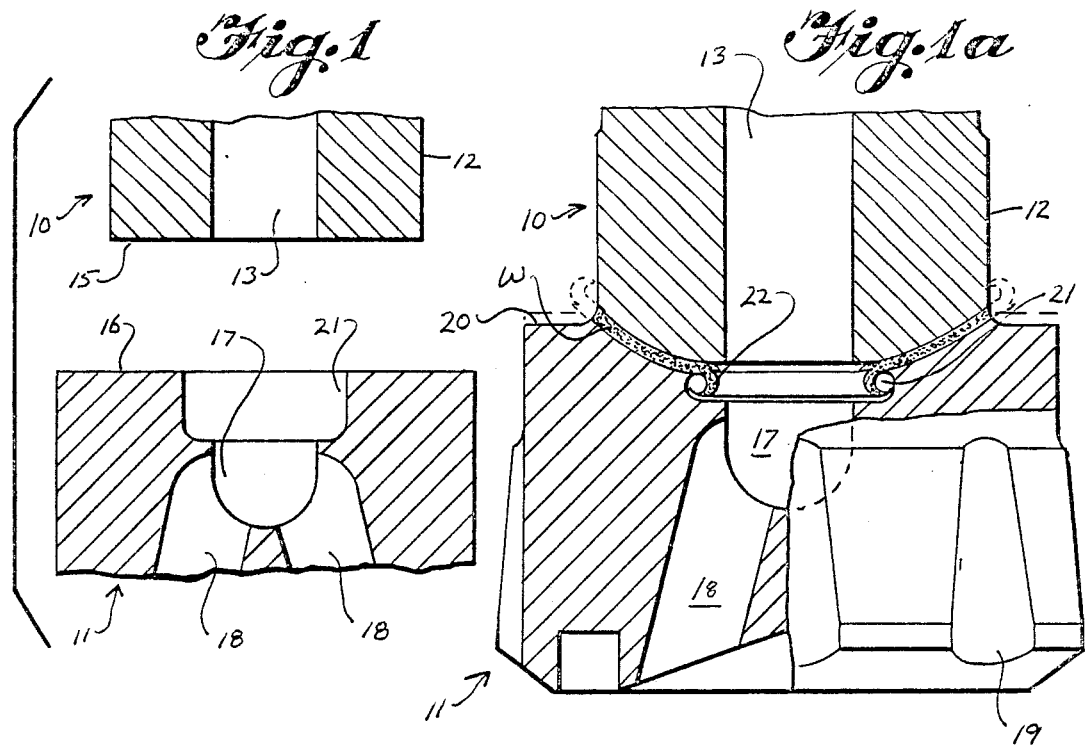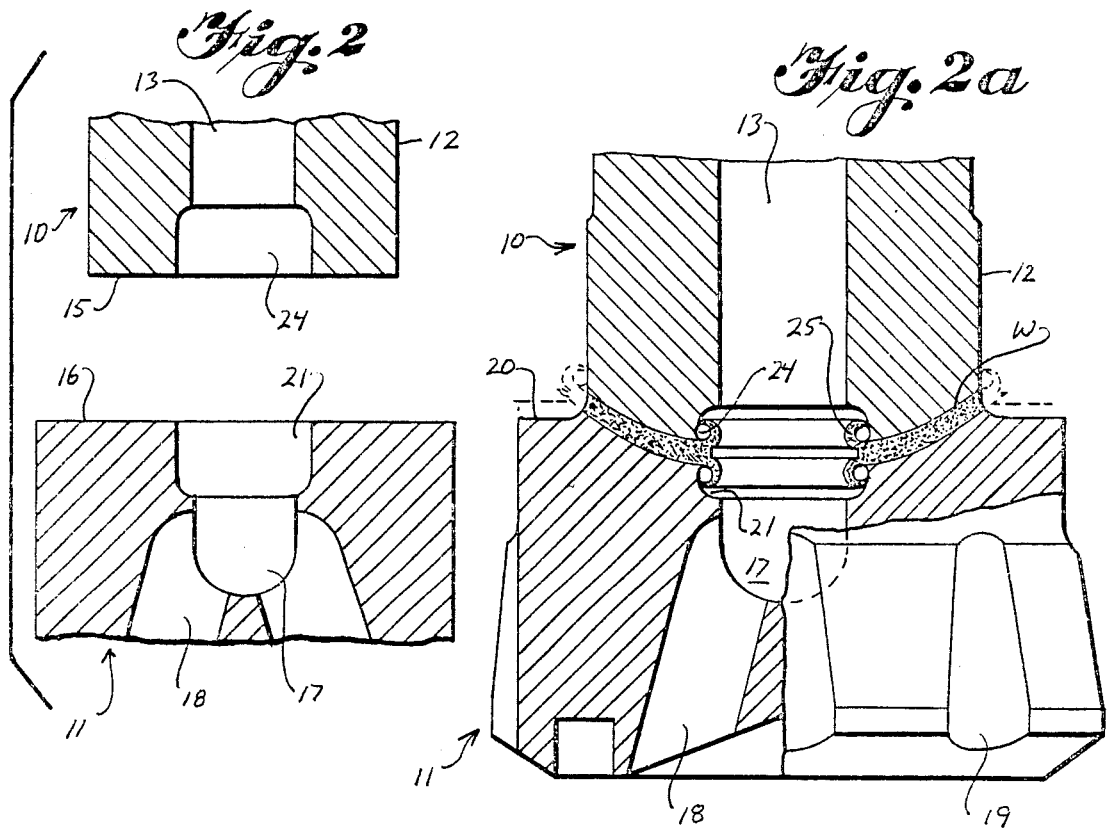

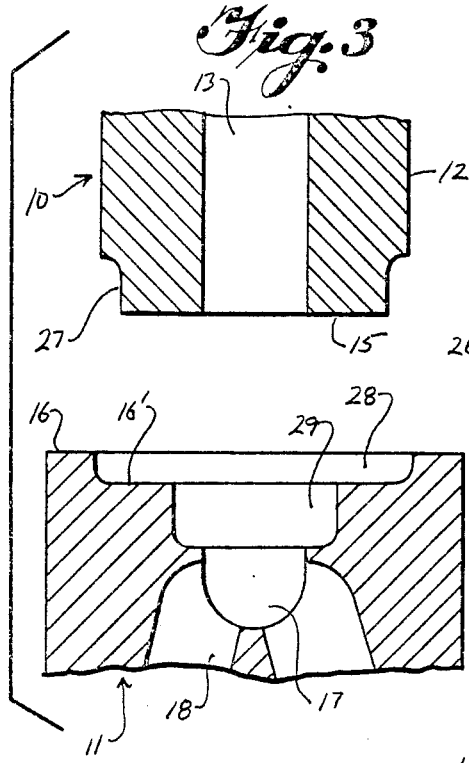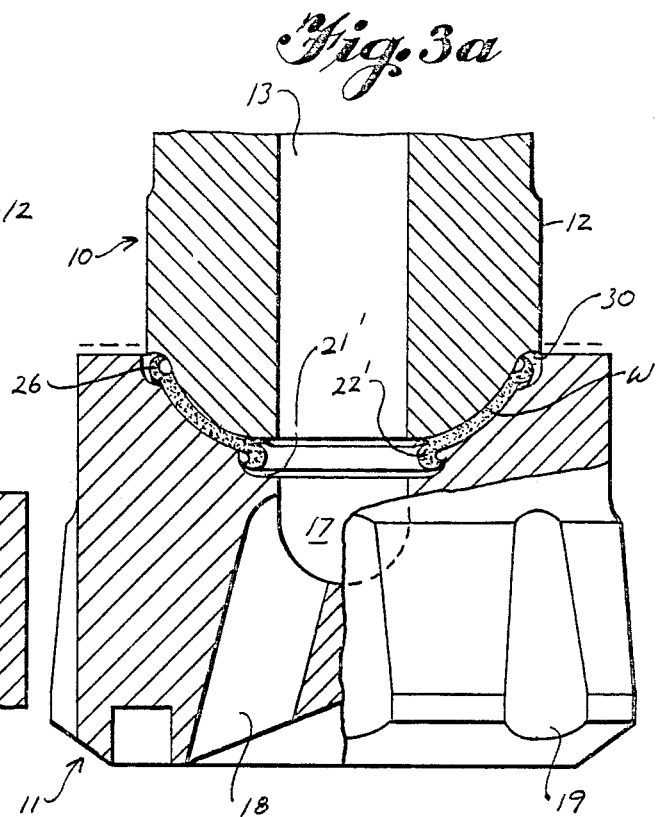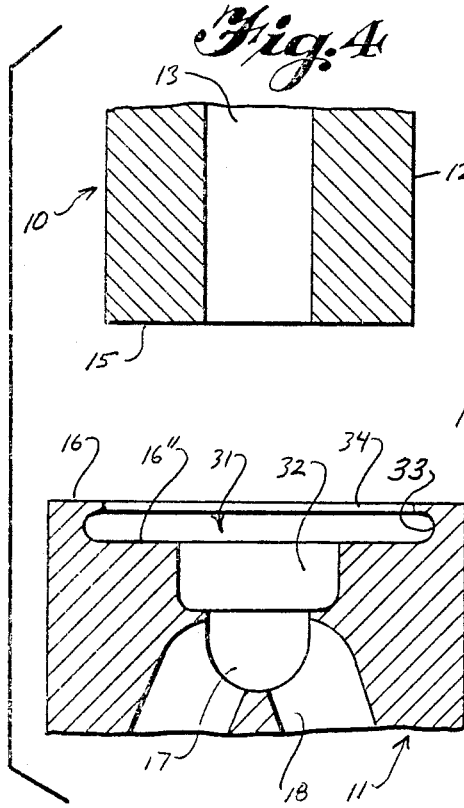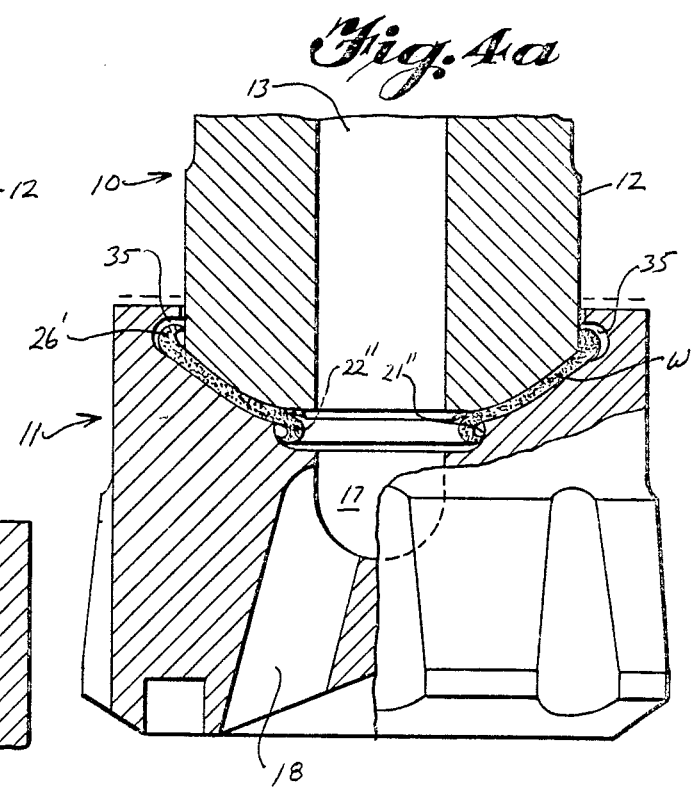

METHOD OF REPLACING DRILL BIT HEADS

BACKGROUND OF THE INVENTION

1. Field of the Invention

This invention is generally directed to methods for securing impact or cutting heads to the shanks of drill bits and especially drill bits for use in down-the-hole mining or drilling operations and more specifically to techniques for joining the component parts by utilizing inertia welding techniques. The invention is further directed to providing a method for enabling drill bit shanks to be recycled by enabling drilling bit heads to be removed from the existing shanks and thereafter replaced by new impact or cutting heads thereby achieving a significant savings in tool costs. The invention further discloses a number of innerface configurations for the components being welded together wherein the interface is defined by generally planar and abutting surfaces having areas defined therein in which flash material may be received as the components are diffusion bonded by inertia welding. Utilizing the teachings of the present invention, it is possible to construct or reconstruct mining bits so that the impact end thereof may be constructed of a very wear resistant material with the shank portion being constructed of a less costly impact resistant steel which can be reutilized after the working end of the bit has become worn.

2. History of the Related Art

In down-the-hole mining operations, use is made of impacting drill bits which consist of an elongated shank having a cutting or impacting head disposed at one end thereof. During the use of such bits, the shanks are impacted and rotated so as to drive the cutting or impacting ends or heads downwardly through subsurface rock or other material formations. Due to the amount of wear and compression that such tools encounter, it is necessary that the cutting or impacting heads be formed of wear resistant alloy materials and include tooth-like components which are manufactured of extremely wear resistant alloy materials. Even when utilizing such wear resistant materials, after periods of time, the cutting or impacting elements must be replaced. In conventional drill bits, the shanks and the cutting or impacting ends were considered to be an integral unit which meant that any time part of the wear resisting materials forming the working end of the tool became worn, the entire drill bit was replaced. Due to the cost of the wear resistant materials which are associated with such drill bits, such a practice is not economically sound.

It is frequently the case that although the working end of the drill bit may become worn, the shank remains in effective working condition. In order to overcome the shortcomings of prior conventional drill bits, it has been proposed to make the work engaging ends or impacting ends of the drill bits selectively mounted to one end of the shanks. In this manner, the cutting ends may be selectively engaged and dismounted after the wear elements associated therewith fail due to prolonged usage.

In U.S. Pat. No. 4,083,415 to Kita et al., one type of mounting mechanism for a replaceable work engaging member for a drill bit is disclosed. In this arrangement, the lower end of the shank includes a reduced diameter portion which extends outwardly from a radial flange provided along the length of the shank. A recessed groove is formed in the reduced diameter portion of the shank and serves as a seat for engagement with ball elements which are secured in place by set screws. The work engaging end portion of the bits are designed to fit over the reduced diameter portion of the shaft of the drill bit and thereafter are locked into engagement with the recessed portions provided therein. By adjusting the set screws, the amount of tension on the ball elements can be regulated so as to permit the work engaging member to be removed as desired.

Unfortunately, such mechanical locking arrangements have not proven to be entirely successful in use in the field. The amount of strain and stress that is placed between the two engaging parts is so great that oftentimes the mechanical locking engagement will fail thereby resulting in the complete loss of the cutting element in the down-hole drilling operation. In addition, the mounting portions of the shafts of the drill bits often become damaged due to the stresses created between the two parts especially when stresses cannot be appropriately counteracted by the mechanical locking elements therebetween. Further, such mechanical locking features require additional bit structure which adds significantly to the increased cost of the drill bits. Another type of mechanical locking arrangement for replaceable head portions for drill bits is disclosed in U.S. Pat. No. Re. 30,952 to White wherein the removable head portion is retained on the shaft portion of the bit by a spline and thread locknut arrangement. Again, such a connection has not proven to be totally successful due to the extreme amount of stress which is imparted between the mechanical locking elements resulting in the failure of the locking components after prolonged use.

In order to avoid the problems associated with mechanical locking arrangements for use with replaceable heads for drill bits, it has been proposed to weld cutting heads to the prepared ends of drill bit shanks. Although such prior art welding techniques do allow the cutting heads to be formed of a more wear resistant or abrasion resistant material while the shank is formed of an impact resistant material, problems remain with failures of the welds during the use of the drill bits. Additional welding techniques utilized to attach the working components of a drill bit to the shank are arc welding techniques which frequently result in an uneven bond between the elements which may result from the weld joint being unevenly heated or from coarse grain structures which are encountered in the weld zone when the liquid metals forming the weld are improperly cooled after they have been heated. Some examples of prior art drilling elements wherein the operating end of the drill is welded by traditional arc welding techniques are disclosed in U.S. Pat. Nos. 1,826,085 to Mulock, 2,096,132 to Pearce, 2,119,349 to Pearce, 2,719,026 to Boice, 4,006,788 to Garner and 4,299,297 to Lloyd. In addition, in U.S. Pat. No. 2,750,156 to Coats, a technique for brazing the cutting elements or heads of drill bits to the shanks is disclosed.

SUMMARY OF THE INVENTION

This invention is directed to a process for inertia welding the impacting or working ends of down-the-hole drill bits to the shanks of such bits wherein the interfacing portions of the working ends and the drill bit shanks are designed so as to include intimately contacting planar portions and recessed areas for receiving flash material which is generated during the welding process. The invention discloses a plurality of embodiments for structuring the weld interface in such a manner so as to insure an intimate bond between the shanks and the working ends of the bits. In some embodiments of the invention, at least one annular recess is provided within an interfacing end of the working end of the drill bit in order to provide one or more annular recesses in which the flash material generated during the inertia welding process may be selectively received. In alternate embodiments of the invention, the interfacing ends of the drill bit shanks may also be selectively designed to include an annular recessed area or a reduced diameter portion adjacent the interfacing end for cooperatively establishing a flash receiving recess area adjacent the mating interfacing ends of the working end of the drill bits.

In yet a further embodiment of the invention, the drill bit shanks may be received within an enlarged recess formed in the interfacing end of the working ends of the drill bits with the area of the weld being generated between the planar wall formed by the bottom of the recess and the lowermost or interfacing portion of the drill bit shank.

It is the primary object of the present invention to provide a process and structure for welding the working ends of the down-the-hole drill bits to drill bit shanks so as to permit the working end of the drill bits to be formed of a more wear resistant material and yet be selectively and securely welded to the shanks of the drill bits and which shanks are formed of a less expensive impact resistant steel.

It is a further object of the present invention to provide a process for welding the working ends of the down-the-hole drill bits to drill bit shanks in such a manner that the working ends of the drill bits may be selectively removed after the wear resistant materials incorporated therewith have become deteriorated and with new working ends being selectively secured to the drill bit shanks by inertia welding such new working ends thereto.

It is also an object of the present invention to provide a process for inertia welding the working ends of down-the-hole drill bits to drill bit shanks wherein the interface between the working ends and the drill bit shanks are configured so as to provide annular recesses in which flash metal may be displaced during the welding process without such flash material interfering with the normal use of the bit and without requiring the removal of such flash material prior to the drill bits being ready for use.

Brief Description of the Drawings

FIG. 1 is a partial cross sectional assembly view of a first embodiment of the present invention showing the interfacing end of a hollow drill bit shank and the opposing interfacing surface of the working end of the drill bit.

FIG. 1a is a cross sectional view taken through the drill bit of FIG. 1 illustrating the joint formed by an inertia welding process wherein the flash material is contained within a formed annular recess so as not to interfere with the communication between the core of the drill bit shank and the fluid ducts within the drill bit cutting or impacting end.

FIG. 2 is a partial cross sectional assembly view of a second embodiment of the present invention showing recesses being formed in both the interfacing ends of the drill bit shank and the working end of the drill bit.

FIG. 2a is a cross sectional view illustrating the weld zone created utilizing the configuration of FIG. 2.

FIG. 3 is a partial cross sectional assembly view of a third embodiment of the present invention wherein the interfacing end of the drill bit shank is formed of a reduced diameter so as to be cooperatively seated within a recessed area formed within the interfacing end of the working end of the drill bit shank.

FIG. 3a is a cross sectional view showing of the weld zone created utilizing the structure of the drill bit shown in FIG. 3.

FIG. 4 is a partial cross sectional assembly view of another embodiment of the present invention wherein an outwardly extending and inwardly inset groove or recess is provided within the interfacing end of the working end of the drill bit so as to thereby create an annular recess outwardly of the interfacing end of the drill bit shank during the inertia welding process.

FIG. 4a is a cross sectional view illustrating the welding zone created during the inertia welding of the configuration shown in FIG. 4.

DESCRIPTION OF THE PREFERRED EMBODIMENT

Figure 5:
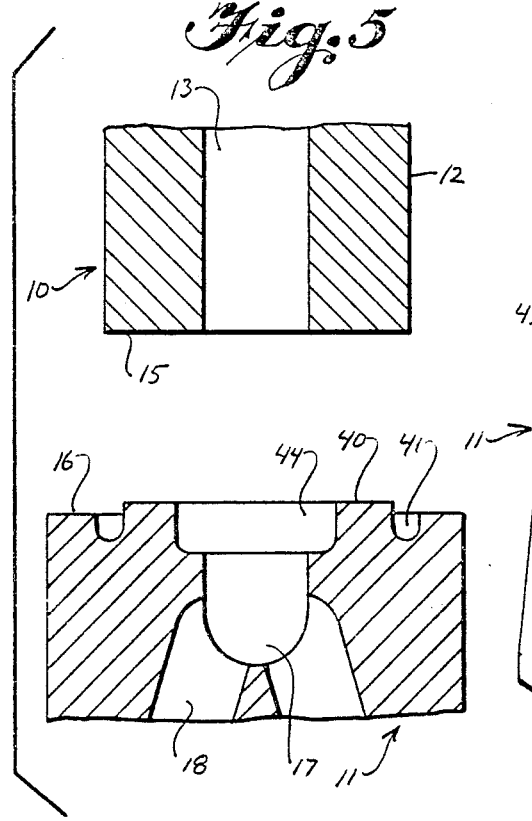
FIG. 5 is a partial cross sectional assembly view of yet another embodiment of the present invention where the interfacing end of the working end of the drill bit is configured so as to provide a stepped interfacing surface area having a recess or groove annularly formed therebetween for the receipt of flash material created during the welding process.

With continued reference to the drawings, the present invention discloses a number of configurations for forming inertia welds between a drill bit shank 10 and an impacting or working end 11 of a down-the-hole drill bit. Generally, the shank of the drill bit will be formed as an elongated tube having an outer cylindrical side wall 12 and an inner channel 13 which is generally oriented axially along the length of the rod or shank. In some instances, the outer cylindrical surface of the shanks may be fluted. The lowermost end portion 15 of the drill bit shank defines a generally planar surface which is designed to abut with the opposing facing surfaces 16 which define the uppermost portion of the working end portion 11 of the drill bit. The working end member may have different configurations but is generally circular in cross section especially adjacent the uppermost surface 16 thereof. A generally axial fluid channel 17 is formed in the upper portion of the working member which channel communicates with outwardly diverging supplementary fluid channels 18 which extend through to the outer tip or cutting edge portion 19 of the working end member 11.

As previously discussed, one of the objects of the present invention is to allow the working end portion of the drill bit to be manufactured of a higher cost wear resistant metallic alloy material while permitting the shank portion of the drill bit to be manufactured and formed of a lower cost impact resistant steel. In this manner, when the working head 11 becomes worn, the working head may be severed from the drill bit shank and thereafter a replacement head inertia welded thereto. With this process, the steel shank may be reutilized thereby resulting in significant decreases in equipment expenses for drilling operations.

As shown in the drawings, the working head is generally of a greater diameter than the drill bit shank and therefore an outwardly extending annular flange 20 will be created between the elements during the inertia welding process. When materials are inertia welded, one of the two elements which are to be joined are retained in a collet chuck and flywheel assembly which is rotated while the opposing component is retained in fixed relationship thereto. As the movable component is rotated relative to the fixed component, a force is applied axially along the components urging them together. As the flywheel assembly rotates, heat is developed at the interface of the materials and a welding occurs across the interfacing components as the rotation begins to cease. During this process, material which is heated at the interface between the rotating components begins to flow and forms a flash material which when cooled creates weld upsets which project outwardly from the welding interface. In some instances, it is necessary that the weld upset or flash material be removed after welding thereby requiring additional treatment of the weld area which increases the production cost. In addition, when substantially hollow members are to be joined, the flash material may also move inwardly blocking channels provided centrally of the components. Such interference with the channel is undesirable. Therefore, the present invention utilizes various interfacing configurations between the components to be joined so as to provide recesses in which the weld upset and flash material may be received as the components are joined.

In FIGS. 1 and 1a, the interfacing end portion 15 of the steel shank of the drill bit is shown as being generally planar and annular in configuration. As previously discussed, the shank is of a smaller diameter than the opposing working end of the drill bit. The upper surface 16 of the drill bit working end 11 is defined by a generally planar outer annular end and an inner recessed annular pocket 21 which communicates with and extends outwardly of the channel portion 17 formed therein. In this manner, an open area is defined outwardly of the channel portion 17 within the working member wherein flash material may be received as the components are welded. As shown in FIG. 1a, the weld formed between the components will extend diagonally from the area of the recessed portion 21 upwardly and outwardly to the flange 20. During the welding process, the interfacing portions will be driven axially toward one another thereby causing the surface 15 of the drill bit to be urged downwardly with respect to the surface 16 of the working member of the drill bit. As the materials are joined, an inner weld upset will be formed by flash material 22 which material will be retained when in the outer portions of the recessed area 21 in the working end 11 of the drill bit. In this manner, none of the flash material will interfere with the fluid channels 13 and 17 in the drill bit shank and the drill bit working head, respectively. Any flash material being exposed on the outside of the weld zone may be removed if desired.

In FIGS. 2 and 2a, another embodiment of the invention is disclosed which is similar to that of FIGS. 1 and 1a except that an additional recessed area 24 has been formed in the lower face 15 of the drill bit shank 10. The recess 24 is shown as being generally of the same size and dimension as the recess 21 and will further serve to provide an area in which flash material may be received as the weld is developed. It should be noted with respect to the weld W shown in FIG. 1a, that a portion of the flash material or upset shown at 22 extends inwardly with respect to the remaining portion of the flash. In the embodiment of FIGS. 2 and 2a, a larger recessed area is formed in which to receive the flash material thereby allowing the flash to form equally on either side of the connecting elements. The upset in FIG. 2a is shown at 25. Again, the weld W is substantially similar to that as shown in FIG. 1.

In the embodiment of the invention as shown in FIGS. 1 and 2, an outer flash or weld upset is created which may be removed if desired. In FIGS. 3 and 3a, the interfacing ends of the drill bit shank and the working end of the drill bit have been modified so as to automatically confine the outer weld upsets which are shown at 26 in FIG. 3a. In this embodiment, the lower end portion 27 of the drill bit shank is shown as being of reduced cross section and defines an interfacing surface 15 which is of lesser cross sectional diameter than the cross section taken with respect to the major portion of the shank defined by the side walls 12. The working end is defined having a pair of countersunk recessed portions 28 and 29, both of which define a diameter which is greater than the diameter of the fluid passageways 13 and 17 and which are axially aligned with both of the fluid passageways. The recessed portion 28 defines a diameter which is greater than the diameter of the lowermost end portion 27 of the drill bit shank. In this manner, the recessed end portion 27 of the drill bit shank 27 may be selectively seated within recess 28 so that the surface 15 of the drill bit shank will engage with the welding surfaces 16' formed between the recessed portions 28 and 29. The recessed portion 29 will function as the recessed portion 21 of FIGS. 1 and 2 to create an area in which flash material may be received so as to insure that the flash material does not interfere with the fluid passageways 13 and 17.

In this embodiment, in order to provide an area in which to entrap and encase the outer flash material shown at 26 in FIG. 3a, the recess 28 is of substantially equal diameter to the diameter of the main cross section of the drill bit shank shown at 12. Thereby, when the parts are united by inertia welding, a small annular chamber generally shown at 30 will be created between the outer walls defined in the recess 28 and the outer walls defining the reduced diameter end portion 27 of the drill bit shank. The flash material 22' formed along the inner portion of the weld zone will be confined within an annular recess 21' which is similar to that shown in FIG. 1.

With respect to FIGS. 4 and 4a of the drawings, a modification of the embodiment shown in FIGS. 3 and 3a is disclosed. In this embodiment, the interfacing surface 15 of the drill bit shank is not modified and is of the same configuration as shown in FIG. 1. In order to accomodate the outer flash material or weld upset which will be formed during the inertia welding of the components as well as the inner flash material upset, the working end portion 11 will be modified to include countersunk recessed areas 31 and 32 which are aligned generally axially with the fluid passageways 13 and 17 of the component parts of the drill bit. The recess 32 will function generally similar to recess 29 in the embodiment of FIG. 3, however, the recess 31 has been modified and is shown as including an outwardly extending or oriented portion 33 which is inset within the end of the face 16 of the working end portion of the drill bit. In this manner, an inwardly extending flange element 34 is created in the upper face 16 of the working end of the drill bit 11. The diameter defined by the flange 34 is generally equal to the diameter defined by the side walls 12 of the shank 10. When the shank 10 is urged through the opening defined by the flange 34, the surface 15 will abut the opposing surface 16' defined by the lower portion of recess 31 and will do so in such a manner that an annular chamber 35 will be created between the side walls 12 of the shank and the opposing walls of the working end 11 of the drill bit as shown in FIG. 4a. As the components are welded together, a weld W will be formed as shown in FIG. 4a wherein the inner flash upset 22' will be retained within an inner annular area 21" while the outer upset material 26' will be contained within the outer annular area or enclosure 35.

Figure 5A:
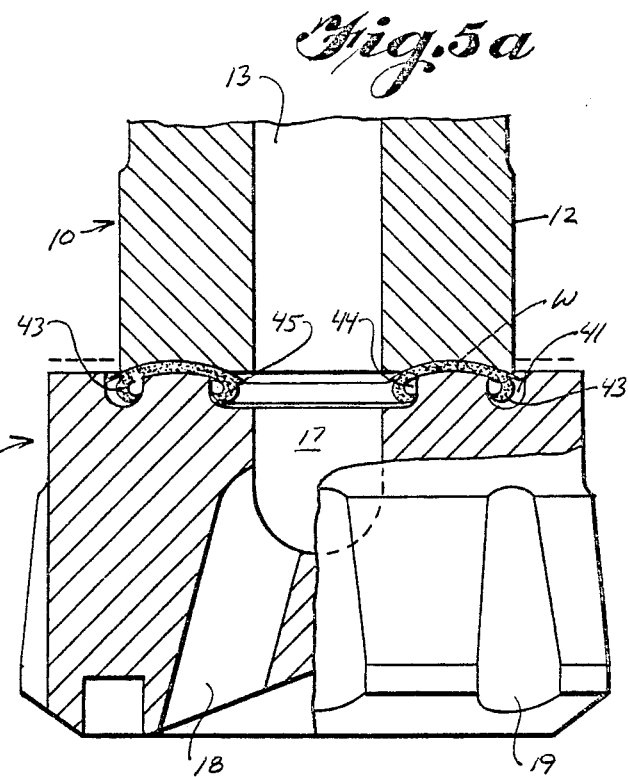
FIG. 5a is a partial cross sectional view showing the welding zone created during the inertia welding of the working end of the drill bit and shank of FIG. 5.

With reference to FIGS. 5 and 5a, another embodiment of the present invention is disclosed in greater detail. In this embodiment, the drill bit shank is the same as the drill bit shank shown in FIGS. 1 and 4 and is therefore unmodified having an interfacing end portion shown at 15 which is substantially the same diameter as the side wall 12 of the drill bit shank. In order to define areas for entrapping both the inner and outer flash material between the components to be joined in this embodiment, the opposing end portion 16 of the working end of the drill bit includes a raised annular surface 40 which is spaced upwardly with respect to the remaining generally planar surface portion 16. Further, an annular groove 41 is defined between the raised annular surface 40 and the remaining surface portion 16. The diameter of the recess 41 is shown as being substantially equal to the diameter defined by the outer walls 12 of the shank 10. In this manner, when the components are joined, the recess 41 will provide an enclosed chamber in which outer flash material 43 may be received. The working end 10 is further provided with an axially positioned recess portion 44 which communicates with the channel 17 and forms an area in which the inner flash upset material may be received during the welding process as was disclosed with respect to the embodiment of FIG. 1.

In this embodiment of the invention, as the tool shank and working end of the drill bit are joined by inertia welding, the material along the annular portion 40 will be forced downwardly and outwardly and inwardly so as to create the outer flash 43 which is entrapped within the annular chamber 41 and an inner flash material 45 which is enclosed within the outer portion of the recess portion 44.

Figure 6:
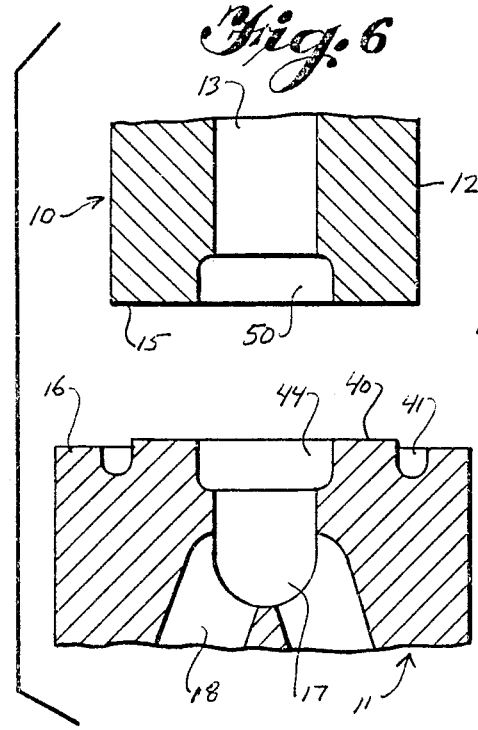
FIG. 6 is a partial cross sectional assembly view showing yet another embodiment of the present invention which is similar to that of FIG. 5 with the exception that a recessed area is also provided in the interfacing end of the drill bit shank.
Figure 6A:
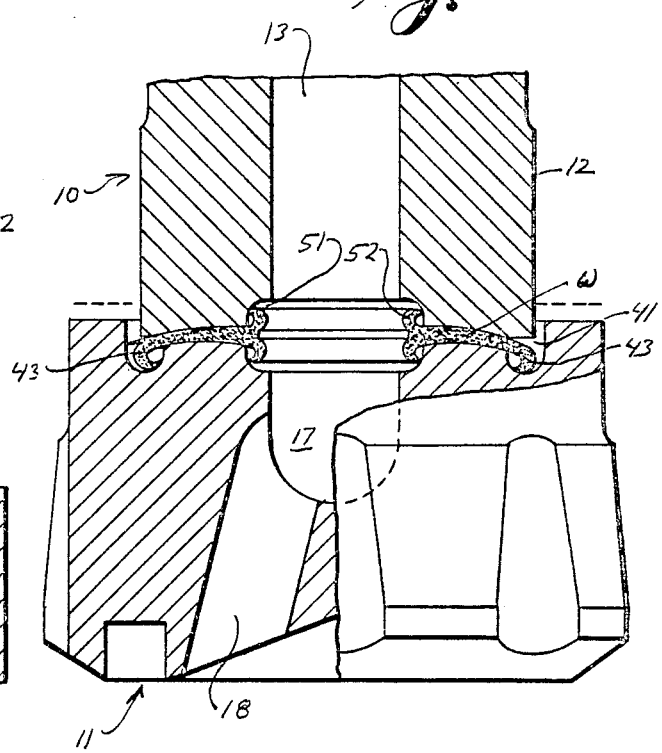
FIG. 6a is a cross sectional illustration of the weld zone established utilizing the configuration of interfacing elements as shown in FIG. 6.

In FIGS. 6 and 6a, a modification to the embodiment of the invention disclosed in FIGS. 5 and 5a is disclosed in greater detail. In this embodiment, the working end portion 11 of the drill bit is configured exactly the same as that of the embodiment shown in FIGS. 5 and 5a. The interfacing end 15 of the drill bit shank, however, has been modified to the form of the invention disclosed in FIGS. 2 and 2a. In this embodiment, a recess 50 which is generally the same configuration as recess 44 is provided in the central portion of the interfacing lower surface 15 of the drill bit shank. In this manner, the recess 50 will cooperate with recess 44 to form an annular chamber 51 in which the inner flash upset material 52 will be retained when the components are joined by inertia welding as shown in FIG. 6a.

From the foregoing, it can be observed that the present invention discloses several modified configurations for the interfacing portions of a drill bit shank and the working end of the drill bit which provide for enclosing the flash material upsets that are formed as the components are joined together by inertia welding. The embodiments of the invention in FIGS. 1 and 2 enclose the inner flash material which is formed adjacent the channels which pass through the drill bit shank and working end of the drill bit so that the flash material will not interfere with such open channel. In FIGS. 3-6, the embodiments disclose alternative configurations for insuring that the outer flash material is not exposed exteriorly of the drill bit shank after the inertia weld has been created.

In any of the embodiments disclosed, it is possible to remove the working end of the drill bit after it has become worn by simply severing the drill bit to form a configuration for the end of the drill bit as shown in FIGS. 1, 4 and 5. By tooling the end of the drill bit, the configurations of 2, 3 or 6 may also be obtained. Thereafter, an appropriately configured working end of the drill bit may be appropriately secured to the old shank by inertia welding.

I claim:

1. A method for uniting the working end of a down-the-hole drill bit to a shank wherein the shank is formed of impact resistant material and includes outer wall defined by a first diameter and an interfacing portion which is in opposing relationship to an interfacing portion of the working end of the drill bit and wherein an elongated opening of a second diameter is provided through the shank which is axially aligned with at least one opening in the working end of the drill bit and wherein the working end is formed of a wear resistant material comprising the steps of:
    (a) Forming the interfacing portion of the shank and the interfacing portion of the working end to include substantially planar surface portions;
    (b) modifying the configuration of the interfacing portion of the working end of the drill bit to provide a first access therein in which flash material may be received so as to not interfere with said openings, said first recess having a diameter which is greater than the second diameter of the elongated opening through the shank and being generally coaxial with the working end of the drill bit and which is in open communication and extends outwardly with respect to said opening in said working end;
    (c) Axially aligning said interfacing portions of the shank and the working end so that said planar surface portions are in abutting contact; and
    (d) Inertia welding the shank and working end wherein flash developed by the inertia welding is received within said first recess outwardly with respect to the elongated opening in the shank.

2. The method of claim 1 including the additional step of forming a second generally circular recess generally centrally of the interfacing portion of the shank of the drill bit, said second recess being generally coextensive and aligned with said first recess in the working end of the drill bit and thereafter joining the shank and working end by inertia welding.

3. The method of claim 2 including the additional step of forming an annular groove in said interfacing portion of the working end by inertia welding.

4. The process of claim 3 in which the interfacing portion of the working end of the drill bit includes a raised annular central portion which extends between said first circular recess and said annular groove.

5. The method of claim 1 in which said first recess is countersunk in axial alignment with a second recess formed in said working end of said drill bit, said second recess having a diameter which is at least as great as the first diameter of the shank of the drill bit and defining an annular seat in which the interfacing portion of the shank of the drill bit may be selectively seated, said first recess being spaced inwardly of said second recess so as to receive flash material therein when said shank and said working end are united by inertia welding.

6. The method of claim 5 in which said interfering end of the drill bit shank is of a reduced diameter with respect to said first diameter so as to form an annular area between said interfacing portion of the shank and the walls defining said second recess in the interfacing portion of the working end of the drill bit in which flash material may be received during the inertia welding of the shank to the working end of the drill bit.

7. A method for replacing the worn working ends of down-the-hole drill bits with new working ends formed of wear resistant material having an interfacing end having generally planar surface portions while utilizing a common drill bit shank wherein the drill bit shank includes an elongated opening having a first diameter oriented axially thereof and which shank is formed of an impact resistant material and is defined by an outer diameter and wherein an axial opening is also provided in the working ends of the drill bit comprising the steps of:
    (a) Preparing the interfacing end of the new working end of the drill bit to include a first generally central circular recess which is axially aligned with the opening therein and which extends outwardly therefrom, said first recess having a diameter greater than the first diameter of the elongated opening through the shank;
    (b) Severing the worn working end of the drill bit from the shank so as to create an interfacing end having a generally planar surface;
    (c) Aligning and intimately contacting the interfacing ends of the shank and the new working end of the drill bit; and
    (d) Inertia welding the aligned interfacing ends together with the interior flash material created being retained within said first circular recess so as to be spaced outwardly of said elongated opening through the shank.

8. The method of claim 7 including the additional step of forming a second generally circular recess in said interfacing end of the shank, said first and second recess being of approximately the same size and configuration and being aligned when the shank and new working end are aligned.

9. The method of claim 7 in which said first recess is formed within said interfacing end of said new working end so as to create an annular flange therein, said first recess extending outwardly beneath said flange, said flange being of a size to cooperatively encircle the interfacing end of the shank as the shank is seated within said first recess.

10. The method of claim 9 in which said new working end of the drill bit includes a countersunk recess which is axially aligned with said first recess, said countersunk recess being of a lesser diameter than said first recess.

11. The method of claim 7 in which said interfacing end of said new working end includes an annular recess which is spaced outwardly of said first recess, said annular recess having a diameter substantially equal to the diameter of the shank.

12. A method of welding a working end to the shank of a down-the-hole bit wherein the shank includes an elongated opening therethrough of a first diameter which is aligned with at least one opening in the working end of the drill bit and wherein the shank is formed of an impact resistant steel and has an interfacing end which is defined having an outer diameter and wherein the working end is formed of a wear resistant alloy material and includes an interfacing end of a diameter which is greater than said first diameter, including the steps of:
    (a) Forming the interfacing end of the shank to include outermost planar surface portions;
    (b) Forming the inferfacing end of the working end to include planar surface portions which are engageable with said planar surface portions of the shank and at least one first generally axially aligned generally circular recess having a diameter which is greater than the first diameter of said elongated opening through the shank and which extends outwardly with respect to the opening in the working end so that flash material may be received during welding;
    (c) Aligning the interfacing end of the shank and working end of the drill bit so that the planar surface portions thereof are in abutting contact; and
    (d) Inertia welding the shank and working end together with flash material being recieved within said first recess outwardly with respect to said elongated opening in the shank and the opening in the working end.

13. The method of claim 12 in which said interfacing end of the working end of the drill bit includes a second annular recess portion which extends outwardly of the shank when the interfacing ends are in abutting relationship whereby flash material may be received within each of said first and second recesses.

14. The method of claim 13 including a third annular recess formed in said interfacing end of the shank for receiving flash material adjacent the opening therethrough.

* * * * *